April 22, 1924.
E. E. SLICK
VEHICLE WHEEL
Filed Nov. 14, 1919
1,491,559
4 Sheets-Sheet 1
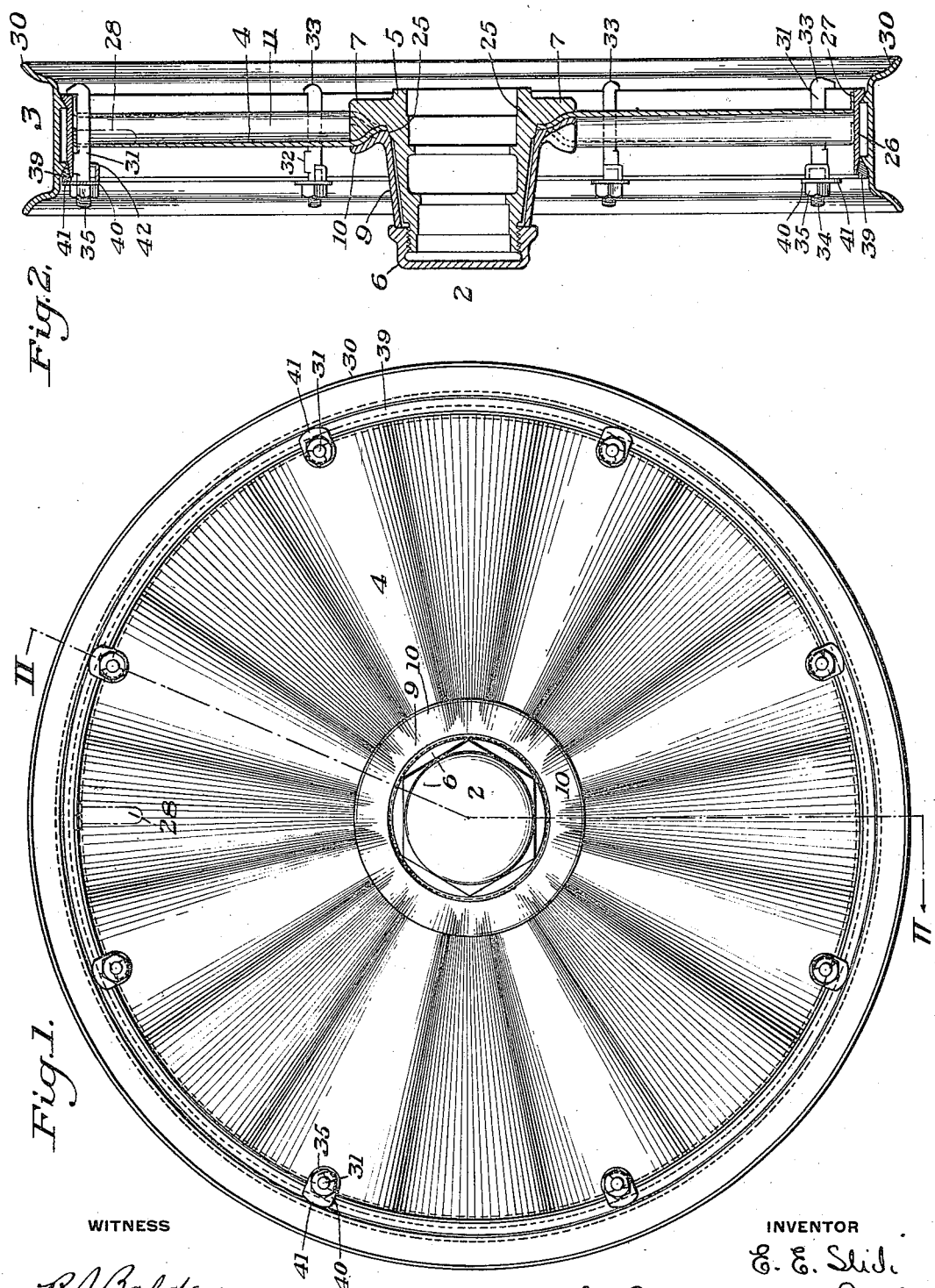

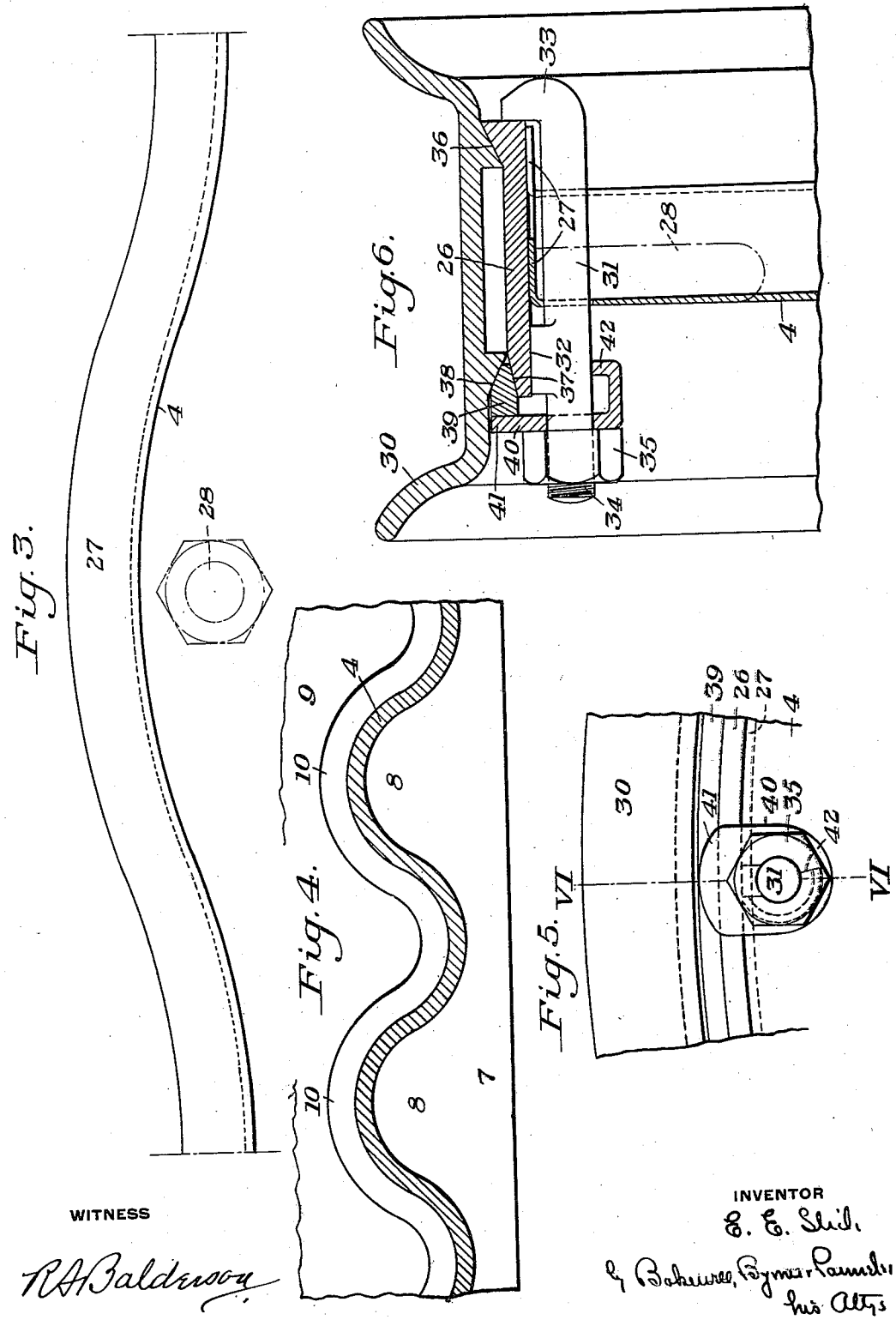

April 22, 1924.

E. E. SLICK

VEHICLE WHEEL

Filed Nov. 14, 1919

WITNESS

INVENTOR

April 22, 1924.
E. E. SLICK
VEHICLE WHEEL
Filed Nov. 14, 1919
1,491,559
4 Sheets-Sheet 4
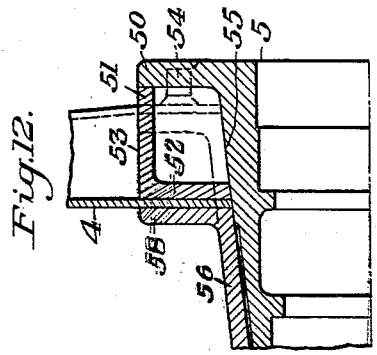
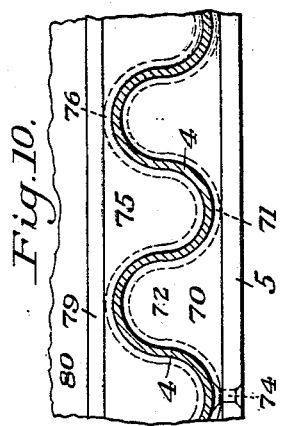
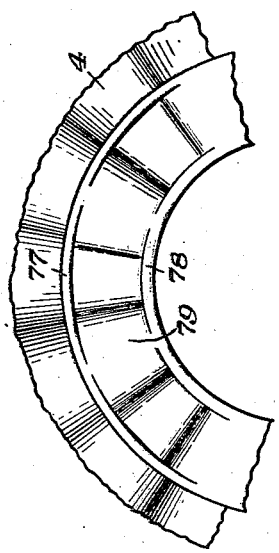
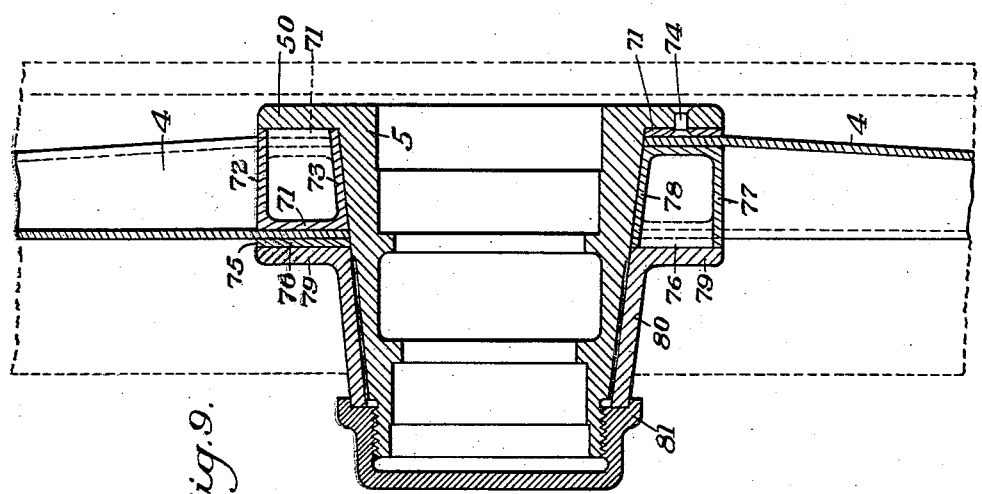

Patented Apr. 22, 1924.

1,491,559

UNITED STATES PATENT OFFICE.

EDWIN E. SLICK, OF PITTSBURGH, PENNSYLVANIA.

VEHICLE WHEEL.

Application filed November 14, 1919. Serial No. 338,002.

*To all whom it may concern:*

Be it known that I, EDWIN E. SLICK, a citizen of the United States, residing at Pittsburgh, in the county of Allegheny and State of Pennsylvania, have invented a new and useful Improvement in Vehicle Wheels, of which the following is a full, clear, and exact description, reference being had to the accompanying drawings, forming part of this specification, in which:—

Figure 1 is a side elevation of a vehicle wheel embodying the invention.

Figure 2 is a section along the line II—II of Figure 1.

Figure 3 is a detail development of a portion of the outer edge of the corrugated web or disk, the rim being removed.

Figure 4 is a detail view showing a developed cross section taken along a portion of the circle through the corrugated disk near the hub.

Figure 5 is a detail side view showing one of the bolts and associated parts for holding the demountable rim.

Figure 6 is a detail sectional view along the line VI—VI of Figure 5.

Figure 8:
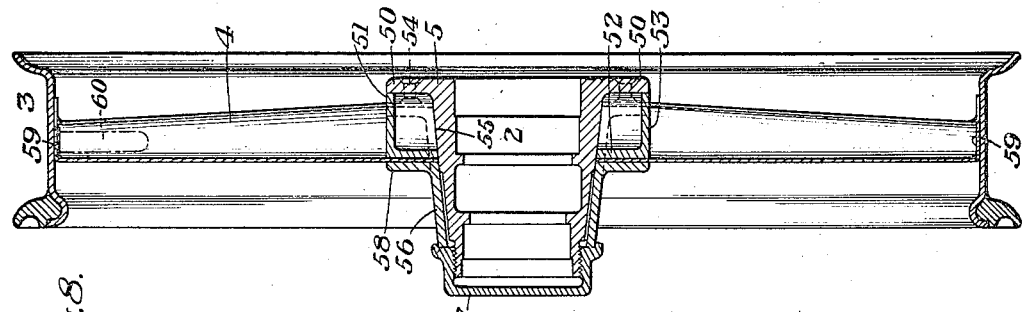
Figure 7:
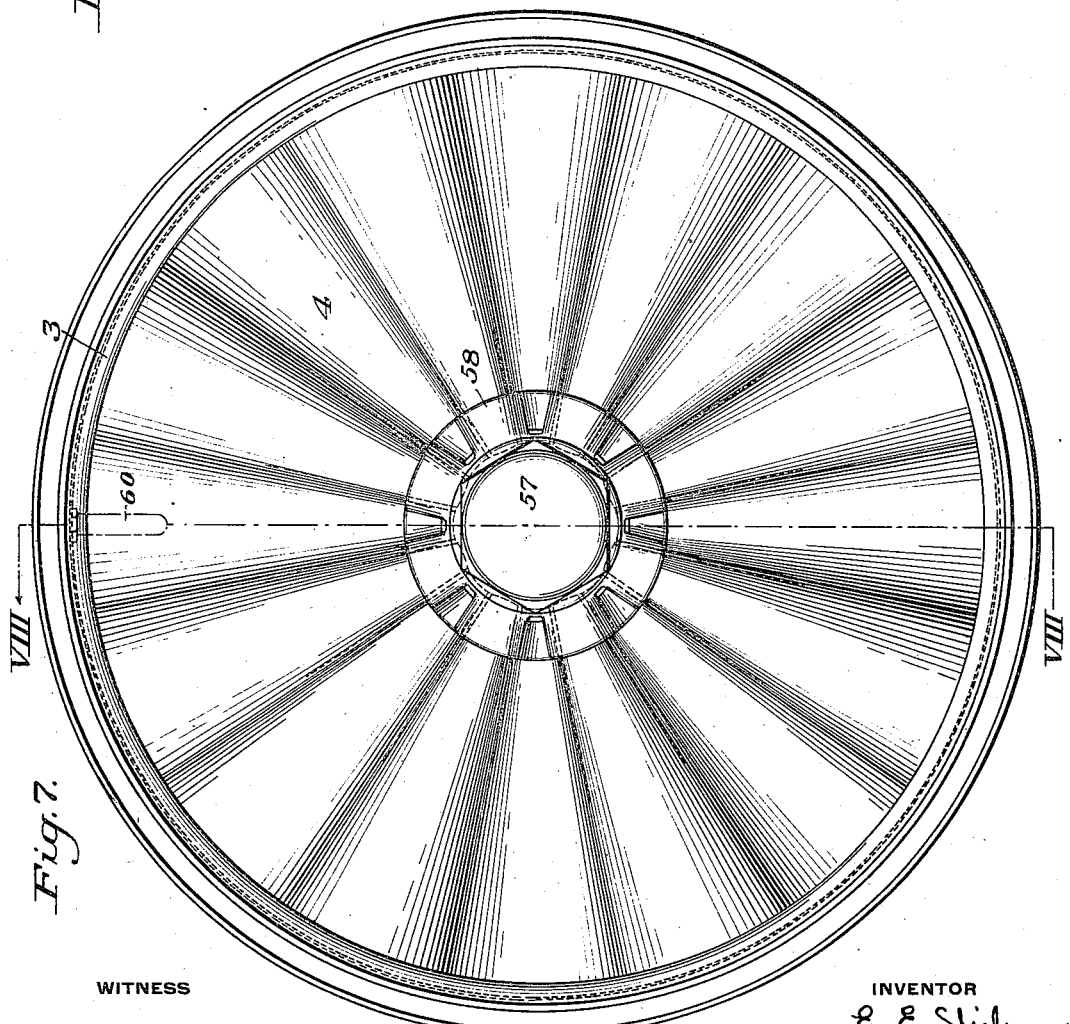

Figures 7 to 12, inclusive, illustrate modifications. Figure 7 is a side elevation of a wheel embodying one of such modifications. Figure 8 is a section along the line VIII—VIII of Figure 7. Figure 9 is a detail section through the hub and central portion of the web illustrating another modification. Figure 10 is a developed view through the web taken around a portion of the hub shown in Figure 9. Figure 11 is a detail view of the outside of the filler shown in Figure 9, and Figure 12 is an enlarged detail view showing the structure of the disk clamping means at the hub of the wheel shown in Figures 7 and 8.

The present invention relates to vehicle wheels and more particularly to a vehicle wheel in which a corrugated disk joins the hub and the rim. The invention also relates to an improved means for demountably securing a tire rim to a vehicle wheel.

The object of the invention is to produce a strong, light and simple vehicle wheel and, with this object in view, the invention consists in the combination and arrangement of parts hereinafter described and more particularly pointed out in the claims, the advantages of which will be apparent to one skilled in this art from the following description.

Referring first to the embodiment of the invention illustrated in Figures 1 to 6, inclusive:—A vehicle wheel comprising a hub indicated generally by reference numeral 2, a rim indicated generally by reference numeral 3, and a corrugated web or disk 4 joining the hub and rim. The hub piece 5 is illustrated as the usual hub used in automobiles. It is threaded at its outer end and is provided with a hub cap 6. The inner end (the end next the vehicle) of the hub 5 has an outwardly extending flange 7 which forms a shoulder or abutment against which the inner edge of the disk 4 is clamped. As shown in Figures 2 and 4, this shoulder is provided with convolutions 8 which register with the corrugations in the disk 4. The disk 4 is clamped against the shoulder of the flange 7 by means of a follower 9, the inner end of which is flanged at 10 and bent into convolutions corresponding to the convolutions of the shoulder of the flange 7, and the corrugations of the disk 4. The follower 9 is pressed against the disk to clamp it against the hub shoulder by means of a cap 6, which is threaded so that the hub wheel may be demounted from the hub by unscrewing the cap 6, taking off the follower 9 and pulling the wheel off the hub. Another wheel may then be placed on the hub, the follower 9 replaced and the cap 6 screwed into place. The corrugations, as illustrated in the drawings, are radial corrugations extending from the hub to the periphery of the disk 4, where it joins the wheel rim, although the disk may be otherwise corrugated within the broader scope of the invention. In the embodiment of the invention illustrated in Figures 1 to 6, inclusive, the corrugations 11 of the disk 4 are of the same depth from the hub to the rim, the corrugations, of course, being sharper at the smaller circumference around the hub than they are at the larger circumference at the outer edge of the disk next the rim. As shown in this modification, the corrugations do not extend to the extreme inner edge of the disk 4, but the extreme inner edge of the disk 4 preserves the uncorrugated circular edge of the disk, the corrugations being pressed into an initially flat disk. This provides a straight circular inner edge for the disk 4. This inner edge can be more accurately machined and makes a better centering fit over the hub than is the case of a disk in which the corrugations extend to the extreme inner edge of the disk. Moreover, in this structure, the flange part of the hub may be made lighter and there is not the necessity of using the filler piece as shown in the modification illustrated in Figures 7 to 12 in which the disk is corrugated to its extreme inner edge.

As shown in Figure 2, the straight inner edge of the disk fits over a tapered seat 25 which causes accurate centering. The outer edge of the disk is bent over at right angles and is welded to the inner rim 26 of the rim. As shown in the drawings, the disk 4 joins the rim along a serpentine line along the middle portion of the felly ring or rim 26. The line of junction between the disk and the inner rim 26 is preferably a little to the inner side of the middle rim and the bent over portion 27 extends toward the inner side of the wheel. This permits a sufficient space at one of the corrugations for the valve or filling tube of a pneumatic tire to extend through the inner rim 26. This valve is indicated in dotted lines at 28 in Figures 1, 2 and 3.

The corrugated disk 4 provides the requisite strength, particularly the necessary side stiffness and resistance. The corrugations give the disk a side stiffness not obtainable in uncorrugated disks. The metal of the disk is made of a thicker gauge at the hub portion to support the greater strains to which the metal is subjected. The disk is reduced or tapered to a thinner gauge at the edge where the area of the metal is greater and the metal is subjected to less strain. The tapered corrugated disk herein shown gives a maximum of strength with a minimum of weight.

A demountable outer or tire rim 30 is mounted on the inner rim 26. A number of bolts 31 are welded at 32 to the inside of the inner rim 26. These bolts extend through holes cut in the edge of the disk 4 and are provided with hooklike ends 33, which engage the inner side of the inner rim 26. The other ends of the bolts 31 are threaded at 34 to receive nuts 35.

The inner rim 26 has an inclined face 36 against which fits a complementary face on the inside of the tire rim 30. The outer edge of the inner rim 26 has an inclined face 37 opposite the inclined face 38 on the outer rim 30. A wedge ring 39 is arranged to fit in between these two faces to firmly clamp the two rims together. Washers 40 are provided for the bolts 31. The washers 40 have ears 41 which fit against the wedge ring 39. The other edge of each washer has a right angle flange 42 which extends along, and at its end fits against the shank of the bolt 31. As shown in Figure 5, this flange 42 is circular and extends somewhat less than 180 degrees around the bolt 31. When the rim 30 is to be demounted, the nuts 35 are loosened and the washers 40 may then be turned to the left, as viewed in Figure 5, so that the ears 41 are turned away from the wedge ring 39 to permit its removal. The flange 42, since it extends part way only around the bolt, permits the washer to be turned. When another tire rim is mounted and the wedge ring 39 is in place, the washers 40 are turned to the position shown in Figure 5, the flange 42 serving as a stop to hold the washers 40 in proper position and keep them from being turned beyond such position as the nuts 45 are tightened by being screwed in a right hand direction. This forms a simple and secure device for holding the demountable rim in place.

Referring to the modification shown in Figures 7, 8 and 12:—The wheel comprises a hub 2, a rim 3 and corrugated web or disk 4, the parts having the general arrangement shown in Figures 1 and 2. The hub 2 comprises a hub piece 5 shown as the usual hub piece for an automobile. Formed on the inner end of the hub piece 5 is a flange 50. This flange is flat on both sides and serves as a seat for a filler piece 51, which is corrugated to fit the corrugations of the disk 4. As shown in Figures 8 and 12, the filler piece 51 is substantially L-shaped in cross section having a vertical corrugated wall 52 and an annular wall 53 which fits against the flange 50. The bottoms of the corrugations in the wall 52 also abut against the flange 50 and are riveted thereto by rivets indicated by dotted lines at 54. These rivets hold the filler piece 51 from rotation relative to the hub piece 5. The disk 4, as shown in its modification, has its corrugations extending to the extreme inner edge of the disk, the extreme inner edge of the disk fitting against the tapered seat 55 of the hub. The inner edge of the corrugated disk is machined to fit snugly over the tapered seat or barrel 55 of the hub to center the wheel. The central portion of the disk 4 is removable to clamp against the corrugated seat of the hub portion which is formed by the corrugated filler block 51, by means of a runner-like follower 56 and the hub cap 57 threaded on the outer end of the hub piece 5. The follower 56 is a ring or sleeve which extends along the hub piece 5 and has an outwardly extending flange 58 which fits against the corrugated disk 4. The flange 58 is formed with two corrugations or convolutions corresponding to those of the disk 4 and filler piece 51. When the hub cap is turned up to clamp the wheel in place, the follower 56 and hub cap 57 are limited to a comparatively small area back of the outer end of the follower 56. This permits the hub cap to be drawn up very tight to clamp the follower securely against the disk. As shown in Figures 7, 8 and 12, the corrugations 4 are radial as in Figure 1, but are not of the same depth from the hub to the periphery. As shown in Figure 8, the corrugations are tapered at the hub and then tapered or flattened out somewhat toward the edge of the disk where it joins the felly or rim 3. The disk 4 is preferably pressed out of a tapered blank, the blank having a thicker gauge at the center than at the periphery, so that the disk 4 will have the greater thickness at the hub where it is subject to the greatest strain. The outer edge of the disk which is turned over at right angles toward the inside (the side of the wheel toward the vehicle) of the wheel is indicated at 59 and is secured thereto preferably by spot welding. The corrugations form of themselves the space at the outside of the disk for the valve stem of a pneumatic tire, such valve stem being indicated by dotted lines at 60.

In Figures 9, 10 and 11 is illustrated a modification in which two filler pieces are employed for clamping the disk at the hub. The hub piece 5 has a flat outwardly extending flange 50. Seated against this flange is a filler piece 70, which in turn forms the corrugated seat for the web or disk 4. As shown in this modification, the filler piece 70 comprises a corrugated face 71 and outer and inner webs 72 and 73, the edges of which abut against the flange 50. The corrugated side 71 at the bottom of these corrugations fits against the flange 50 and is riveted thereto by rivets indicated at 74. A second filler piece 75 of substantially the same structure as the first filler piece, fits against the outer surface of the corrugated disk 4, the filler piece 75 having a face 76 and outer and inner webs 77 and 78 against the edges of which bears the flange 79 of the follower 80. The follower 80 is forced against the hub by means of the hub cap 81 threaded on the outer end of the hub piece 5. The two filler pieces 70 and 75 have their exposed outer webs 72 and 77 of a smooth cylindrical form so that there are no exposed corrugations on the hub to gather dirt and the hub presents the appearance of a smooth round hub having the corrugated disk 4 projecting from it.

While I have specifically illustrated and described the wheels embodying my invention, it is to be understood that the invention is not limited to its illustrated embodiment but may be embodied in other vehicle wheel constructions within the scope of the following claims:

I claim:

1. A vehicle wheel comprising a rim, a sheet metal radially corrugated disk attached to the rim, said disk having thicker gauge at its central portion than at its circumferential portion, a hub, and means for detachably securing the central portion of the disk to said hub comprising a corrugated member on said hub, a corrugated follower, and means for pressing said follower against said disk to clamp the latter between said member and follower, said corrugated member and said corrugated follower bearing against substantially the same portion of the disk on opposite sides thereof, substantially as described.

2. A vehicle wheel comprising a rim, a corrugated disk secured thereto, said disk having thicker gauge at its central portion than at its peripheral portion, and means for removably securing the disk to a hub comprising a corrugated follower and means for forcing the follower against the disk, substantially as described.

3. A vehicle wheel comprising a rim, a complete corrugated disk or web secured at its periphery to the rim, said disk terminating at its central portion in a smooth circular edge, and means for securing the central portion of the disk to a hub, substantially as described.

4. A vehicle wheel comprising a rim, a complete corrugated disk secured at its periphery to the rim, a hub, an annular seat, said corrugated disk terminating at its central portion in a smooth uncorrugated edge fitting around the seat on the hub, and means for holding the disk against such seat, substantially as described.

5. A vehicle wheel comprising a rim, a complete disk secured at its periphery to the rim and having a hub receiving hole through its central portion, said disk having radial corrugations extending toward but terminating short of the edge of said central hole, and means for securing the central portion of the disk to a hub, substantially as described.

6. A vehicle wheel comprising a rim, a complete disk secured at its periphery to the rim and having a hub receiving hole through its central portion, said disk having radial corrugations extending toward but terminating short of the edge of said central hole, a hub having an annular seat fitting within the disk hole, and means for removably securing the disk to the hub comprising a seat on the hub having its central portion smooth and its outer portion corrugated to fit the disk, and a follower having a similar and complementary seat fitting against the disk, and means for forcing the follower against the disk for clamping the disk between the two disk seats, substantially as described.

7. A vehicle wheel comprising a rim, a radially corrugated disk secured thereto and having a hub receiving hole through its central portion, a hub fitting within the disk hole and having a member provided with corrugations corresponding to the corrugations of the disk, a follower fitted on said hub and having a flange provided with corrugations corresponding to the corrugations of the disk and member, and a hub cap arranged to press the follower against the disk to clamp the latter between the flange and member.

8. A vehicle wheel comprising a rim, a disk secured at its periphery thereto and having a hole through its central portion, said disk having radial corrugations extending toward but terminating short of the central hole, a hub having a portion adapted to fit into the hole and center the wheel on the hub, and means for attaching the disk to the hub, said means comprising oppositely disposed members bearing on substantially all the area of said disk from the central hole to the outer diameter of the hub.

In testimony whereof, I have hereunto set my hand.

EDWIN E. SLICK.